INVENTOR.
EDWARD J. HAZEN
BY
ATTORNEY

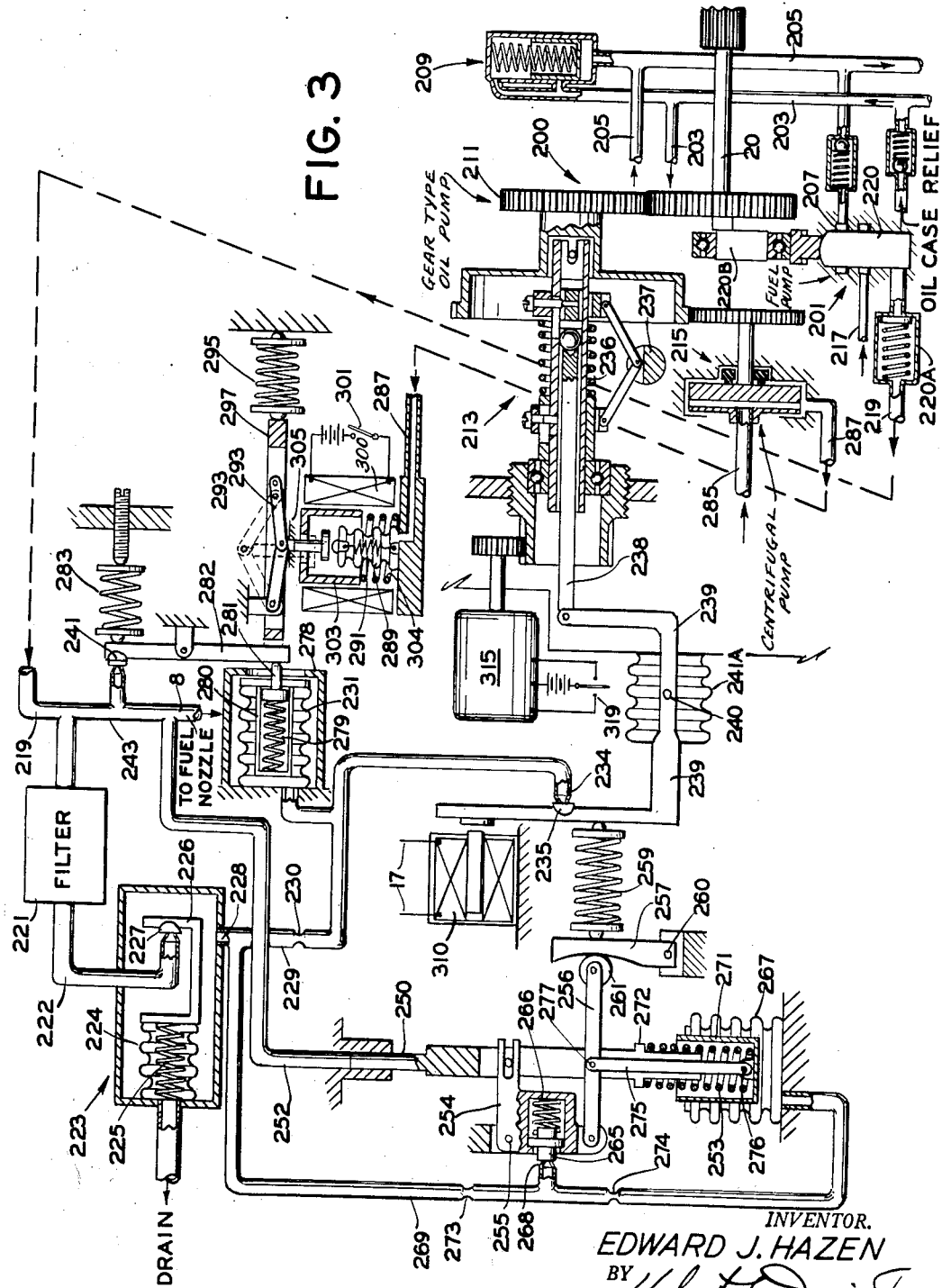

United States Patent Office 2,809,299
Patented Oct. 8, 1957

2,809,299

FUEL REGULATOR SYSTEM AND GOVERNOR FOR GAS TURBINE DRIVEN ELECTRIC GENERATOR

Edward J. Hazen, Woodcliff Lake, N. J., assignor to Bendix Aviation Corporation, Teterboro, N. J., a corporation of Delaware Application June 3, 1950, Serial No. 165,947

23 Claims. (Cl. 290—40)

The present application relates to improvements in a load sensitive fuel regulator system and governor for a gas turbine alternator drive of a type such as disclosed and claimed in the copending application Serial No. 757,109, filed June 26, 1947 by James E. Bevins and now U. S. Patent No. 2,671,860 granted March 9, 1954 and assigned to Bendix Aviation Corporation, and for use in aircraft.

An object of the invention is to provide a fuel control system for use on gas turbines of the type used for driving alternators in which there is provided a speed governor and an output current responsive means effective for resetting the governed speed with the electrical load on the alternator to give a drooping speed-load characteristic to effect an equal disposition of the electrical load between two or more complete power plants operated in parallel.

Another object of the invention is to provide a novel hydraulic system whereby speed droop with electrical load is put into the system hydraulically instead of mechanically with levers and linkages.

Another object of the invention is to provide an arrangement including an electromagnet responsive to the current output of a driven generator for directly affecting the biasing force applied to an overspeed governor so as to reset the governed speed of the prime mover driving the generator, whereby speed droop with electrical load is effected.

Another object of the invention is to provide a novel servo control system including fuel pressure follow-up means with maximum and minimum pressure stops and speed droop and reset means for control stabilization.

Another object of the invention is to provide a novel overspeed fuel cut-off with remote resetting means.

Another object of the invention is to provide a novel overspeed fuel cut-off including in a compact assemblage a bellows responsive to an overspeed condition and an overspeed trip arrangement operated thereby, together with an electromagnet and armature surrounding the bellows for resetting the overspeed trip upon energization of the electromagnet under control of the operator.

Another object of the invention is to provide a novel fuel control system in which the fuel pressure provides servo operating pressure for operating the several control elements hydraulically and in which sliding valves have been eliminated to avoid sticking of the operating parts and leakage of the fuel.

Since it has been found that the system is more stable under high load and under high atmospheric pressure operation conditions, another object of the invention is to provide novel means to vary the magnitude of speed droop on a transient with fuel pressure so as to provide a variable amount of stabilization as required under the different electrical load and flight conditions.

The above and other objects and features of the invention will appear more fully hereinafter from a consideration of the following description taken together with the drawings wherein two embodiments of the invention have been illustrated and described.

In the drawings:

Figure 3 is a schematic illustration of another form of the regulator.

Figure 1:
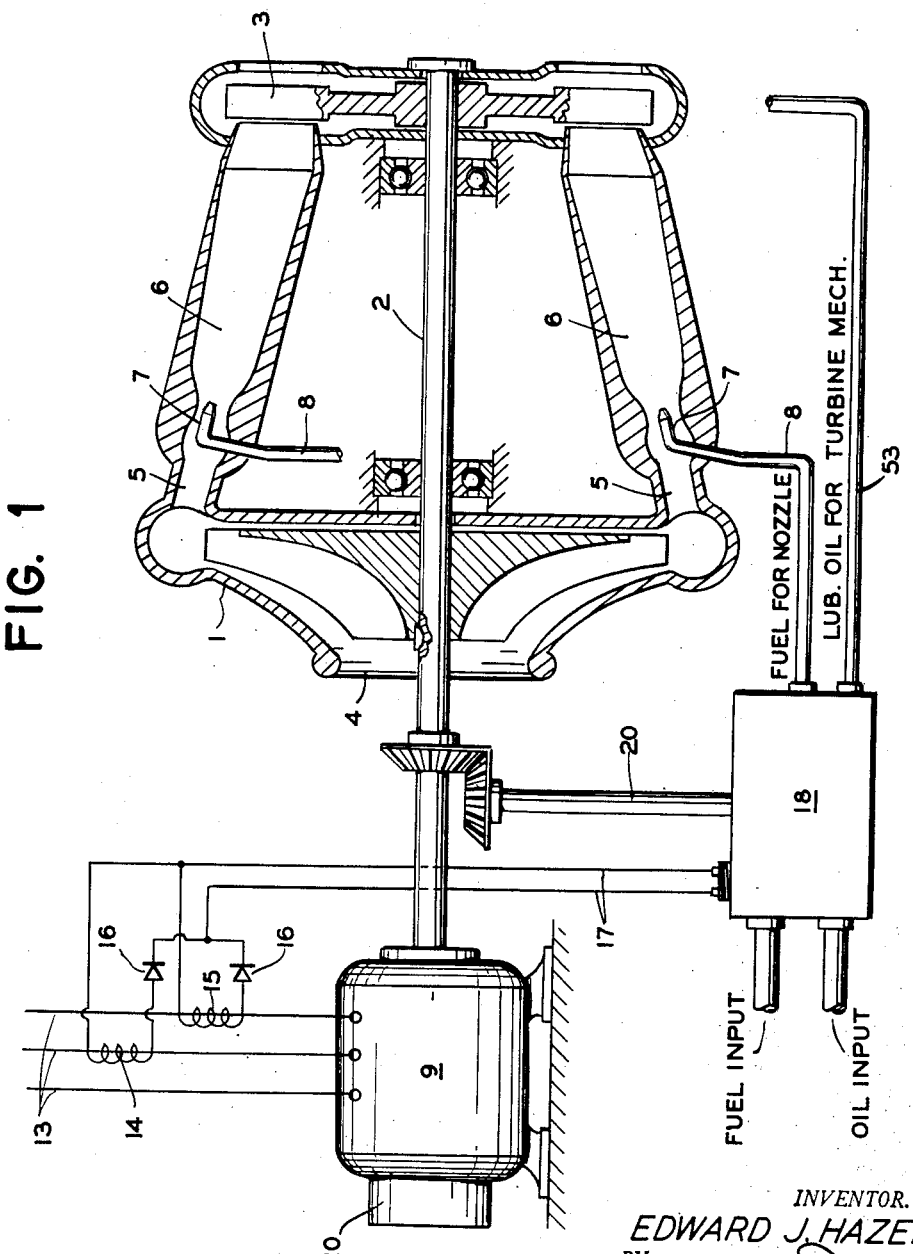
Figure 1 is a schematic illustration of a gas turbine system to which the novel regulator of the present invention may be applied.

Referring to Figure 1, there is shown a typical gas turbine system to which the novel regulator may be applied and including a compressor 1 driven through a shaft 2 by a turbine 3. The compressor 1 has an air inlet 4 and an air outlet passage 5 leading through suitable expansion chambers 6 to the turbine 3. Expansion chambers 6 are heated by suitable nozzles 7 supplied with fuel by conduits 8.

The shaft 2 is arranged to drive an alternator 9 having an exciter 10 also driven by the shaft 2. The output of the exciter 10 is connected across the field of the alternator 9 in a conventional manner. The output lines of the alternator 9 are indicated by numeral 13. Sensitive to the output current in the lines 13 are windings 14 and 15 connected through rectifiers 16 and conductors 17 to a regulator 18 for purposes as explained hereinafter.

The gas turbine and generator system may be of conventional design and therefore a further detailed description thereof is not deemed necessary.

The electrical output of the alternator 9 may be connected in parallel with the output lines of other alternators driven by a gas turbine and regulated by a regulator similar to that indicated by the numeral 18 and described hereinafter.

*Fuel regulator system and governor*

Figure 2:
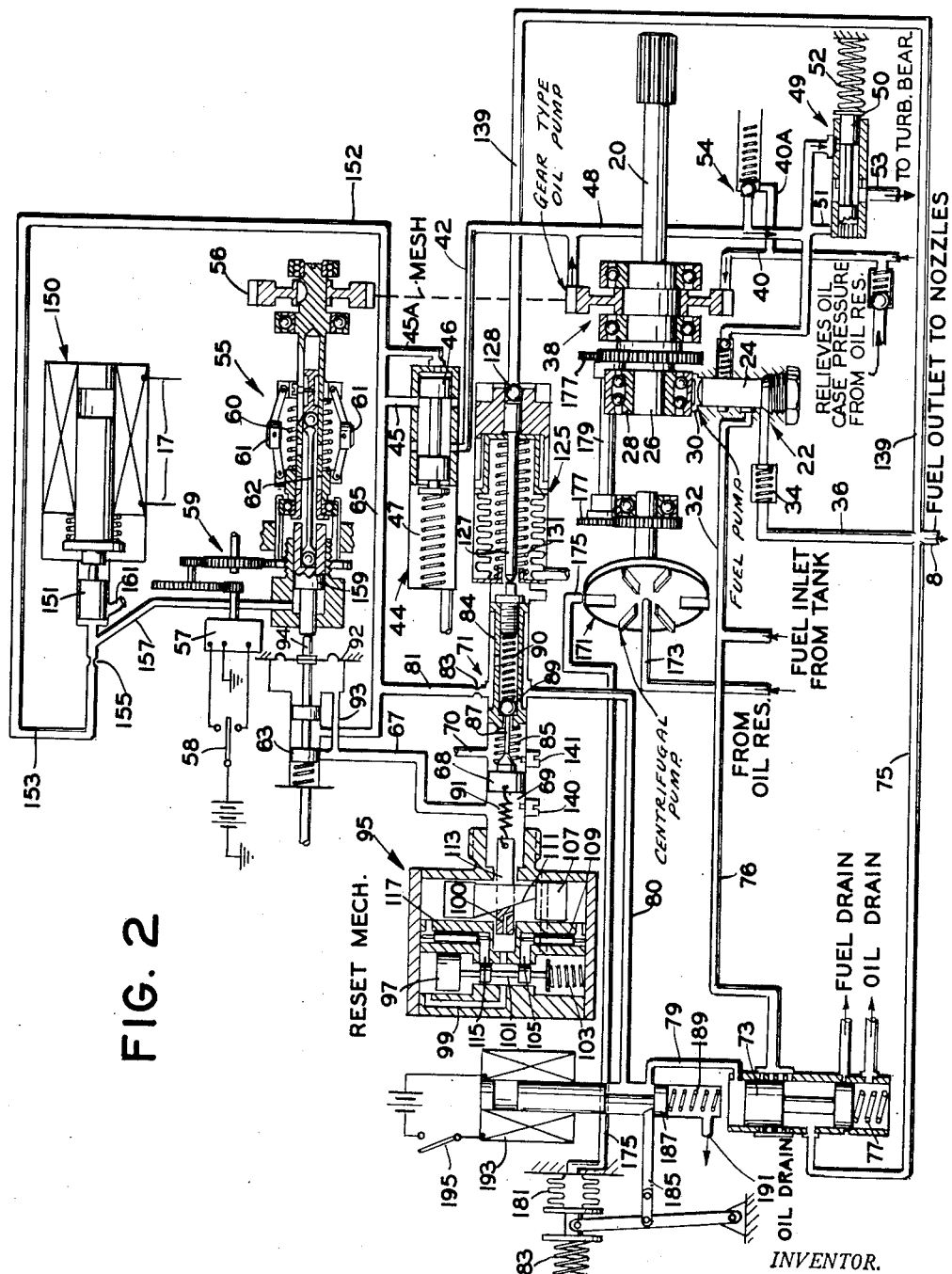
Figure 2 is a schematic illustration of one form of the regulator.

The novel features of the invention reside in the fuel regulator and governor indicated generally in Figure 1 by the numeral 18 and one form of which is shown schematically in Figure 2 and another form of which regulator is shown schematically in Figure 3.

In the form of the invention shown in Figure 2, there is provided a main drive shaft 20 driven as shown in Figure 1 from the turbine drive shaft 2. A fuel pump 22 is driven from the main drive shaft 20 and may include a plurality of reciprocating pistons, one of which is shown schematically herein and indicated by the numeral 24. The pistons 24 are reciprocated by means of an eccentric 26 on which is mounted a roller bearing 28. Suitable connections are made so that shoes 30 transmit the load from the eccentric 26 to the piston 24. Fuel is brought into the cylinders of the fuel pump at the bottom of the suction stroke of the piston 24 through a conduit 32 from a suitable fuel tank and is discharged through check valves 34 in an outlet conduit 36 on the pressure stroke of the piston 24 in a manner well known in the art. The fuel outlet conduit 36 leads to the nozzle lines 8.

A gear type oil pump, shown in Figure 2 schematically and indicated by the numeral 38, is also driven from the main drive shaft 20. Oil is supplied to the gear pump 38 through an inlet conduit 40 from a suitable oil reservoir and is pumped by the gear pump 38 through an outlet conduit 42 to a servo oil pressure regulator indicated herein by the numeral 44 and through the servo oil pressure regulator 44 to outlet conduit 45 for supplying oil to the servo system. The oil pressure regulator 44 includes a piston valve 46 subject to the regulated servo oil pressure applied at one end by a conduit 45A and to the biasing force of a spring 47 applied at the opposite end of the piston valve 45 so as to maintain the servo oil pressure in line 45 at a substantially constant value.

The outlet oil from the gear pump 38 is also directed through a conduit 48 to an oil pressure regulator 49 having a piston valve 50 subjected at one end to the pressure in conduit 48 through a conduit 51 and subjected at the opposite end to the biasing force of a spring 52. The piston valve 50 acting under such forces serves to vary the oil flow to outlet conduit 53 leading to the turbine bearings so as to maintain a predetermined minimum oil pressure in conduit 48.

The servo oil pressure regulator 44 is set to maintain a maximum operating pressure on the servo system, if the pressure from the oil pump 38 should be higher than such selected maximum value. The oil pressure regulator 49 maintains a minimum operating pressure for the servo system, if the external oil pressure should fall off to a value below that which is required to operate the servo system. An pressure relief valve 54 is provided in the line 48 between the oil pump 38 and regulating valve 49 to by-pass oil back to the pump inlet conduit 40 through a conduit 40A, if demand on the pump is reduced.

The basic control of the system is speed which is sensed as shown in Figure 2 by a centrifugal governor 55 driven by the main drive shaft 20 through a gear 56 intermeshing with the gears of the oil pump 38. A reversible motor 57 which may be controlled by the operator through a suitable switch 58 operates through a chain of gears 59 to adjust the setting of a speed setting spring 60 of the governor 55 to change the regulated speed of the engine. The spring 60 cooperates with fly weights 61 to impart longitudinal movement to a stem 62. Thus upon the driven speed increasing sufficiently for the centrifugal force acting on the fly weights 61 to overcome the biasing force of spring 60, the stem 62 is moved longitudinally toward the left under the force exerted on the fly weights 61 and an opposite movement of the stem 62 under force of the spring 60 is effected upon the driven speed decreasing.

The governor 55 operates through the stem 62 a pilot valve 63 which is connected to a servo oil pressure line 65 leading from the regulated servo pressure line 45. The pilot valve 63 controls admission of oil servo pressure from the line 65 to a line 67 to in turn operate a piston 68 slidably mounted in a chamber 69. A drain line 70 opens at the opposite side of the piston 68 from the line 67. The piston 68 controls a second servo valve mechanism indicated generally by the numeral 71 and which is used to control a fuel throttling valve 73. The fuel throttling valve 73 serves to by-pass a portion of the outlet fuel from the outlet line 36 back to the inlet line 32 of the fuel pump 22 through by-pass lines 75 and 76. The throttling valve 73 is biased by a spring 77 in a direction for opening the by-pass lines 75 and 76 and is biased in the opposite closing direction by servo oil pressure applied at the opposite end of the throttling valve 73 through servo pressure lines 79, 80 and 81 leading from the regulated oil servo pressure line 65. The conduit 81 has provided therein a restriction 83 and between the conduits 81 and 80 there is provided the second servo valve mechanism 71 which includes a sleeve 84 biased toward the right by a light spring 85 positioned between the piston 68 and the sleeve 84. The piston 68 controls through a pin 87 a ball valve 89 to reduce the servo oil pressure applied through the restriction 83 and servo valve mechanism 71 to one side of the throttling valve 73. The ball valve 89 is carried by the sleeve 84 and is biased in a closing direction by a spring 90.

Thus, when the pilot valve 63 opens line 67 to pressure line 65, servo oil pressure is applied through the line 67 to the piston 68 so as to tend to open ball valve 89 to bleed servo oil from the lines 81—80 to drain line 70.

The opening of ball valve 89 in turn reduces the servo oil pressure applied to the throttling valve 73 and allows the spring 77 to bias the throttling valve 73 in a direction opening the by-pass conduits 75 and 76 and thereby reducing the fuel flow to the nozzles 7 of the engine.

When the pilot valve 63 is adjusted in a closing direction, the pressure applied to piston 68 is decreased and a spring 91 tends to move the piston 68 to the left. This latter action allows the ball valve 89 under the biasing force of spring 90 to move in a closing direction so that the servo oil pressure applied on the throttling valve 73 is increased causing the valve 73 to move in opposition to the spring 77 tending to close the by-pass conduits 75 and 76 and thereby increase the fuel flow to the engine.

Stabilization system

Stabilization of the control is achieved by the use of temporary speed droop with increasing fuel pressure which is reset to make an isochronous control under steady state conditions. To accomplish this, there is provided the spring 91 which controls the servo oil pressure acting between the pilot valve 63 and piston 68 and which oil pressure also acts on a diaphragm 92 subjected to the pressure in line 67 through a conduit 93. Thus the servo oil pressure acting between the pilot valve 63 and piston 68 also acts on the diaphragm 92 which is connected through a rod 94 to the stem 62 of the centrifugal governor 55 so as to bias the governor speed setting in a direction which increases the speed setting with increase in the servo pressure applied to the piston 68 through conduit 67 as upon the governor 55 calling for less speed and decreases the speed setting with decreases in the servo pressure as upon the governor 55 calling for an increase in speed.

Thus upon the fly ball governor 55 tending to open the valve 63 with increase in speed above a predetermined set value, the servo pressure applied to the diaphragm 92 will be increased acting in a sense to retard further opening of the valve 63 while a decrease in speed below the set value will have an opposite retarding effect.

There is further provided a novel reset mechanism indicated generally by the numeral 95 which acts in a sense tending to wipe out the retarding effect of the diaphragm 92 by resetting the spring 91.

The reset mechanism 95 is a pressure sensitive regulator which slowly moves the end of spring 91 to adjust the force applied thereby to a preselected value whenever the pressure applied through the conduit 67 varies from such value. The mechanism 95 includes a pressure sensitive member 97 connected through conduit 99 and conduit 100 to the pressure applied to the piston 68 through the conduit 67. The piston 97 controls a servo valve 101 biased by a spring 103 in a direction opposing the pressure applied to member 97. Upon the pressure applied through conduit 67 increasing above the preset value of spring 103, the member 97 is biased downward causing valve 101 to open a conduit 105 to the pressure applied through conduit 100. The passage 105 leads to the lower end of a piston 107 through a restriction 109 so that fluid pressure is bled through restriction 109 to the lower end of the piston 107 tending to bias the piston 107 slowly upward. The piston 107 has a cam surface 111 which cooperates with a stem 113 connected to the spring 91 so as to slowly decrease the tension applied by the spring 91 and tending in turn to permit the piston 68 to move in a direction toward the right, as viewed in Figure 2 under force of the servo oil pressure so as to in turn cause piston 68 to further open ball valve 89 to wipe out the retarding effect applied to the centrifugal governor 55 by the diaphragm 92 unless the speed of the turbine 3 has decreased to the desired value.

A decrease in the pressure applied through the conduit 67 to the piston 68 will in turn cause the spring 103 of the reset mechanism 95 to adjust the servo valve 101 in an upward direction opening a passage 115 to servo pressure applied through a conduit 100. The passage 115 is connected through a restriction 117 to the upper end of the piston 107 so as to apply to the upper end of the piston 107 a servo pressure which slowly increases tending to bias the piston 107 downward and the cam surface 111 so as to bias the stem 113 toward the left increasing tension of the spring 91 and tending to cause the piston 68 to move toward the left, as viewed in Figure 2, against the servo oil pressure so as to in turn wipe out the drooping effect caused by the diaphragm 92 on the centrifugal governor 55.

Biasing the servo valve mechanism 71 toward the left, as shown in Figure 2, is a fuel pressure sensing mechanism indicated generally by the numeral 125 which includes a piston 127 and ball 128 subject to fuel outlet pressure in line 36 applied through a conduit 139. Acting in opposition to the fuel outlet pressure applied to the piston 127 is a spring 131.

It will be seen then that upon a decrease in the speed of the turbine 3 as sensed by the centrifugal governor 55 during any transient, the piston 68 moves toward the left due to decrease by governor 55 in the servo oil pressure applied to piston 68 through the conduit 67 tending to close ball valve 89 and causing throttling valve 73 to move in a sense to increase the outlet fuel at line 36 whereupon the piston 127 moves the sleeve 84 of the servo valve 71 also towards the left tending to open the ball valve 89, in response to change in the fuel pressure and anticipating an increase in speed of the turbine 3. The action of the centrifugal governor 55 upon an increase in speed of the turbine 3 then is to decrease the pressure applied to the piston 68 as well as the pressure upon the diaphragm 92 which in turn decreases the speed null setting of the governor 55. The reset mechanism 95, however, in response to such change in the servo pressure applied through the conduit 67 slowly moves the stem 113 in a direction following the motion of the piston 68 until the pressure under diaphragm 92 has returned to the set value which in turn brings the speed setting of the centrifugal governor 55 back to the selected value while wiping out the drooping effect on the centrifugal governor 55 so as to provide stability of control to the system.

*Maximum and minimum permissible fuel pressure limits*

Adjustable stop members 140 and 141 are provided to limit the movement of the piston 68 toward the left and right respectively and thereby provide means for limiting the maximum and minimum permissible fuel pressure. It will be seen then that upon the fuel pressure exceeding the maximum permissible value, movement of the piston 68 will be limited by stop 140 and sleeve 84 under force of the fuel pressure will cause ball valve 89 to be opened wide by the stem 87 of the piston 68. Similarly the ball valve 89 will be fully closed upon the fuel pressure decreasing to below the minimum permissible value by the stop 141 limiting the movement of piston 68 while the sleeve 84 follows the movement of the piston 127 under the biasing force of spring 85.

*Load sensitive device*

To equally distribute the electrical load between two or more complete power plants, each of which is regulated as described, a load sensitive solenoid 150 is provided having a winding connected through conductors 17 to the current responsive windings 14 and 15 affected by the output current in the output lines 13 of the alternator 9 as shown in Figure 2. The solenoid 150 serves to reset the centrifugal governor 55 to a lower speed setting for increasing electrical load. The action of the solenoid 150 is to effect a predetermined droop in the governed speed with increase in electrical load. The solenoid 150 operates a pilot valve 151 which acts as a variable orifice in a servo pressure line 153 connected to the regulated servo pressure line 45 and having a restricted metering orifice 155 and a controlled pressure line 157 applying a variable pressure to a piston 159 acting on the stem 62 of the centrifugal governor 55 so as to apply a pressure to a centrifugal governor 55 which decreases with increase in electrical load as sensed by the solenoid 150.

As the current energizing the solenoid 150 is increased with electrical load, the pilot valve 151 opens the line 157 to a drain passage 161 and the pressure on the piston 159 is reduced due to the metering orifice 155 and the effect on the controlled pressure of the pilot valve opening to drain 161. The reduced pressure decreases the speed setting of governor 55 and causes the load sensitive piston 159 to move in such a way as to open the pilot valve 63 which applies servo oil pressure to the piston 68 which in turn causes the ball valve 89 to tend to open. This in turn reduces the servo oil pressure applied to the throttling valve 73 and allows the spring 77 to actuate the throttling valve in a direction opening the by-pass conduits 75 and 76 and thereby reducing the fuel flow to the nozzles 7 of the engine. A decrease in the electrical load has an opposite effect increasing the speed setting of the governor 55.

*Overspeed control*

In case of failure of the main governing system, there is provided a centrifugal pump shown schematically in Figure 2 and indicated generally by the numeral 171. The centrifugal pump 171 has an oil inlet conduit 173 leading from a suitable oil reservoir and an oil outlet conduit 175 and is coupled to the main drive shaft 20 by means of gearing 177 and shaft 179. The centrifugal pump 171 supplies oil pressure which is proportional to the speed of the engine to a bellows 181 through the conduit 175. When the pressure from the centrifugal pump 171 indicates that a speed in excess of a safe operating speed has been attained, the pressure in the bellows 181 overcomes a spring 183 so as to release a latch 185 to permit a spring loaded plunger 187 under force of the spring 189 to be moved upward as shown in Figure 2. Upon release, plunger 187 cuts off the supply of servo oil to the throttling valve 73 and opens the conduit 79 to a drain conduit 191. This action permits the throttling valve 73 to be biased by the spring 77 to a fully open by-pass position so as to by-pass the fuel from the outlet fuel nozzles of the engine. When the engine has stopped or the speed has been reduced to a safe operating speed, the overspeed trip plunger 187 may be reset by energizing the overspeed trip reset solenoid 193 which may be controlled by the operator through a suitable electrical circuit controlled by a switch 195.

*Second form of the invention—Figure 3*

At exceedingly low temperature it has been found that it becomes increasingly difficult to operate a control system of the type shown in Figure 2 due to the effect of low temperatures on the oil used to operate the servo mechanism.

It has been found advantageous therefore to provide a mechanism in which engine fuel such as gasoline or kerosene may be used as a servo pressure medium. It has been a problem, however, to eliminate sticking of the valve parts when operated by such fuel as a servo medium and a further problem to prevent leakage of the servo fuel. In solving the problem, sliding valves were eliminated due to their tendency to stick in operation by such fuel servo medium.

As shown in Figure 3 the second form of the invention includes a lubricating oil pump of the gear type shown schematically and indicated by the numeral 200 and a radial piston type fuel pump indicated schematically by the numeral 201. Both pumps are driven from the main drive shaft 20 from the turbine shaft 2 as shown in Figure 1. The gear pump 200 has an oil inlet 203 and an oil outlet conduit 205 for delivering oil to the turbine bearings and to a piston sealing ring 207 in the fuel pump 210. The gear pump 200 is pressure protected by a by-pass relief valve 209. A driven gear 211 of the gear pump 200 is used to drive an all-speed fly weight governor 213 and a centrifugal pump 215 which is used as a speed sense for a separate overspeed trip mechanism, as will be explained hereinafter.

Servo control pressure

The radial piston type pump 201 includes a fuel inlet conduit 217 from a suitable fuel tank and an outlet conduit 219 to which fuel is supplied under pressure by a piston 220 through a check valve 220A. The piston 220 is operated by a eccentric 220B driven by the main drive shaft 20, as heretofore explained, with reference to the fuel pump of Figure 2. Servo control pressure is supplied by the fuel pump 201 through the conduit 219 to a suitable filter 221 and from the filter 221 through a conduit 222 to a reducing and regulating valve indicated generally by the numeral 223 and including a bellows 224 subject at its exterior surface to regulated servo fuel pressure and interiorly to drain pressure and the biasing force of the spring 225. The bellows 224 operates through a bracket 226 a flap type valve 227 controlling the opening of the conduit 222 to the interior of the valve 223 so as to maintain the servo fuel pressure in output line 228 at a predetermined value in excess of drain pressure. The servo pressure from the reducing and regulating valve 223 is applied through the conduit 228 to a line 229 having a restriction 230 therein and leading to a bellows or fluid pressure operated motor means 231. The pressure applied to the bellows 231 through the line 229 is regulated by a valve opening 234 controlled by a pilot flap type valve 235. The pilot valve 235 controls the pressure in bellows 231 and is operated by the centrifugal fly weight speed governor 213. The governor 213 is driven from the main drive shaft 20 through the gear pump 200 and includes a speed setting spring 236. The spring 236 cooperates with fly weights 237 to longitudinally position a stem 238 toward the left upon the speed of the engine increasing sufficiently to apply a centrifugal force to the fly weights acting against the setting spring 236 so as to move the stem 238 toward the left. Opposite movement of the stem 238 is effected under force of the spring 236 to the right upon the speed decreasing. The stem 238 operates a linkage arm 239 pivoted at 240 in a sealing bellows 241A to actuate the pilot flap valve 235 so as to regulate the servo pressure in bellows 231. The servo pressure in the bellows 231 in turn operates a main fuel by-pass flap type valve 241 controlling the fuel supply line 243 leading from conduit 219 from the fuel pump 201 to nozzle line 8 into nozzle 7, as shown in Figure 1. In this way any speed error signal from the governor 237 will operate to change the amount of fuel being by-passed from the fuel nozzles 7 and thereby vary the pressure at the fuel nozzles 7.

Control stability

Control stability is adjusted by a fuel pressure feed back which introduces a temporary speed droop during transients which is reset out after a short time.

This is accomplished by balancing the force from a piston 250 subject to the fuel nozzle pressure in line 243 applied through a conduit 252 against a spring 253 and transferring any motion of piston 250 through a bell crank lever 254 pivoted at 255 and operatively connected through an arm 256 and a lever 257 to a spring 259 which exerts a biasing force on the actuating lever 239 of the pilot valve 235. The lever 257 is pivoted at 260 and cooperates with a roller 261 mounted on the arm 256.

Piston 250 is then slowly returned to a fixed null position by operation of a pilot valve 265 by the bell crank lever 254. The valve 265 is held under the biasing force of spring 266 carried by the bell crank lever 254 and controls the servo pressure in a bellows 267 by regulating a valve opening 268 in a line 269 leading to the bellows 267 from the servo fuel regulator 223. Variance of the pressure in the bellows 267 by operation of the pilot valve 265 through the bell crank 254 adjusts the spring 253 which is supported at one end in the bellows 267 by a cup-shaped member 271 while the opposite end of spring 253 bears on the piston 250 at an end 272 so as to slowly return the piston 250 to the fixed null position. The speed of this resetting action is controlled by the size of restrictions 273 and 274 in the line 269 and at opposite sides of the valve opening 268.

Variable stabilization

It has been found that the system is more stable under high load and high atmospheric pressure conditions in which high fuel pressures are required, than under low load and low atmospheric pressure conditions and therefore to provide for the variable amount of stabilization required under different load and atmospheric pressure conditions which may be encountered in normal operation in an aircraft, the magnitude of the speed droop introduced on a transient is varied with fuel pressure by moving the arm 256 in relation to lever 257 so that at low fuel pressures the ratio of motion of the lever 257 to the motion of arm 256 and piston 250 is higher then at high fuel pressures.

This is accomplished by providing an arm 275 which is pivotally connected at 276 to the cup-shaped member 271 carried by the bellows 267 and at 277 to the arm 256 so as to vary the position of the arm 256 with relation to the pivot point 260 of the lever 257 with the position of the bellows 267 which adjusts the spring 253 to balance the engine fuel pressure applied to the piston 250. Thus the position of the bellows 267 varies with such engine fuel pressure so that at low fuel pressures, the roller 261 at the end of arm 256 more nearly approaches the pivot point 260 and the magnitude of the stabilizing effect is greater than under high fuel pressure conditions since the multiplying effect of the lever 257 increases inversely with fuel pressure to provide a stabilizing effect, the magnitude of which varies inversely with the engine fuel pressure.

Maximum and minimum permissible fuel pressure

Maximum fuel pressure is limited by restricting the motion of bellows 231 by a casing 278 and applying the servo force of the bellows 231 through a spring 279, one end of which spring is carried by the movable end of the bellows 231 through a bracket 280, while the opposite end of the spring 279 bears through a button 281 and lever 282 the hydraulic force on the pilot flap valve 241 so as to just balance the hydraulic force on the pilot flap valve 241 when the nozzle pressure is at a predetermined maximum pressure and the bellows 231 is at the extreme position limited by casing 278. Adjustment of the bellows 231 by decreasing the servo pressure therein in turn decreases the fuel pressure at which the pilot flap valve 241 will open. A spring 283 is provided to limit the minimum fuel pressure by holding through lever 282 the pilot flap valve 241 closed at all nozzle pressures below a fixed minimum.

Overspeed trip device

The centrifugal pump 215 driven from the speed governor 237 has a fuel inlet conduit 285 leading from a suitable fuel reservoir and an outlet conduit 287, the pressure in which outlet conduit 287 is proportional to the speed of the engine. The outlet pressure from the centrifugal pump 215 is applied to a bellows 289 through the conduit 287 and acts against spring 291. When the centrifugal pressure reaches a value corresponding to a preselected maximum speed, bellows 289 expands and pushes a toggle mechanism 293 past a center position as indicated by dotted lines in Figure 3 so as to allow the spring 295 to move the push rod 297 against the actuating lever 282 for the by-pass valve 241. This overrides all other controls and opens the by-pass valve 241 reducing nozzle pressure to drain level. The by-pass valve 241 is held open until the overspeed mechanism is reset by momentarily energizing an electromagnet 300 through a suitable electrical circuit controlled by the operator through a switch 301. The electromagnet 300, upon energization, actuates an armature 303 against a spring 304 so as to in turn pull the toggle mechanism 293 back against a stop 305 to the locking position shown in Figure 3, and forcing push rod 297 back against spring 295.

*Speed droop with electrical load*

Speed droop with electrical load is introduced by sensing the load with current transformers 14 and 15, as shown in Figure 1, and using the rectified output to energize solenoid 310 through conductors 17. This results in a biasing force proportional to the electrical load, which force is applied to the control lever 239 for the by-pass valve 235 and resets the null speed of the governor 213 so as to decrease the speed setting of the governor 213 with the electrical load. The basic speed setting of the governor is adjusted by means of a reversible electric motor 315 which is mechanically geared to adjust one end of the spring 236 so as to vary the setting of the governor 237. Direction of rotation of the motor 315 may be conveniently controlled through a suitable electrical circuit by operation of a switch 319.

Although only two embodiments of the invention have been illustrated and described, various changes in the form and relative arrangements of the parts may be made to suit requirements.

What is claimed is:

1. Regulating means for regulating the fuel supply to an engine to drive an electric generator connected to supply power to a variable load; said regulating means comprising a speed governor adapted to respond to the driven speed of said generator when connected thereto, control means for adjusting the calibration of said speed governor, means adapted to respond to current variations in said load when connected thereto, for supplying a corrective signal to said governor adjusting control means, said governor and said control means being adapted to simultaneously control the speed of said engine, and means adapted to respond to engine fuel pressure when connected thereto, for supplying a signal to said speed governor in opposition to said corrective signal.

2. The combination defined by claim 1 including reset means to relatively slowly wipe out said last-mentioned fuel pressure responsive signal.

3. The combination defined by claim 1 in which said last-mentioned means includes means to vary the magnitude of said opposing signal inversely with said fuel pressure.

4. The combination defined by claim 1 including means responsive to adjustment of said control means for supplying a signal to the control means in opposition to said corrective signal, and reset means to supply a signal to relatively slowly wipe out the signal in opposition to said corrective signal.

5. The combination defined by claim 1 in which said engine fuel pressure responsive means includes means for limiting the fuel pressure to within predetermined minimum and maximum values.

6. In a regulating system for a prime-mover driven electric generator connected to supply power to a variable load, the combination comprising a speed governor for said prime mover, control means for adjusting the calibration of said speed governor, means responsive to current variations in said load for supplying a corrective signal to said governor adjusting control means, the speed of said prime mover being controlled simultaneously by said governor and by said control means, means for supplying a stabilizing signal to said speed governor in opposition to said corrective signal, and means to vary the magnitude of said stabilizing signal inversely with said load.

7. In a regulating system for a prime-mover driven electric generator connected to supply power to a variable electrical load in an aircraft under flight conditions; the combination comprising a speed governor for said prime mover, control means for adjusting the calibration of said speed governor, means responsive to current variations in said load for supplying a corrective signal to said governor adjusting control means, the speed of said prime mover being controlled simultaneously by said governor and by said control means, means for supplying a stabilizing signal to said speed governor in opposition to said corrective signal, and means to vary the magnitude of said stabilizing signal inversely with the prevailing atmospheric pressure during flight of the aircraft.

8. In a regulating system for a prime-mover driven electric generator connected to supply power to a variable electrical load in an aircraft under flight conditions; the combination comprising a speed governor for said prime mover, control means for adjusting the calibration of said speed governor, means responsive to change of condition of said governor for affecting said control means to retard further change of condition of said governor, and means to vary the magnitude of said retarding affect inversely with the prevailing atmospheric pressure during flight of the aircraft.

9. For use in regulating fuel for an engine to drive an electric generator connected to supply power to a variable electrical load in an aircraft under flight conditions; the combination comprising a speed governor responsive to the driven speed of said generator for regulating the fuel to said engine, control means for varying the datum of said speed governor, and engine fuel pressure responsive means for affecting said control means to vary the datum of said speed governor so as to retard further change in the fuel pressure, said fuel pressure responsive means including means to vary the magnitude of said retarding affect inversely with the fuel pressure and thereby inversely with the electrical load and the prevailing atmospheric pressure during flight of the aircraft.

10. For use in regulating fuel for an engine; the combination comprising a speed governor responsive to the driven speed of said engine, a first hydraulic system controlled by said governor, a servo motor means operated by said first hydraulic system, a servo valve controlled by said servo motor means, a second hydraulic system controlled by said servo valve, a fuel control piston operated by said second hydraulic system to regulate the flow of fuel to the engine, other fluid pressure responsive means sensitive to the pressure of the regulated fuel, and other means operatively connecting said other fluid pressure responsive means to said servo valve for operating said servo valve in opposing relation to said servo motor means.

11. The combination defined by claim 10 including additional fluid pressure responsive means sensitive to the hydraulic pressure of said first hydraulic system for retarding operation of the speed governor in one sense.

12. Regulating means for regulating the fuel supply for an engine; said regulating means comprising a speed governor adapted to respond to the driven speed of said engine when connected thereto, a first hydraulic system controlled by said governor, a servo motor means operated by said first hydraulic system, a servo valve controlled by said servo motor means, a second hydraulic system controlled by said servo valve, a control piston operated by said second hydraulic system adapted to regulate the flow of fuel to the engine when connected there to, fluid pressure responsive means adapted to respond to engine fuel pressure when connected thereto for operating said servo valve in opposing relation to said servo motor means, said servo motor means including a piston operated by the first hydraulic system, a spring opposing movement of said piston by said first hydraulic system, and means responsive to the hydraulic operating pressure of said first hydraulic system for retarding operation of the speed governor, and other relatively slowly acting means responsive to the hydraulic operating pressure of said first hydraulic system for resetting said spring to a present value upon adjustment of the piston by the first hydraulic system.

13. Regulating means for regulating the fuel supply for an engine; said regulating means comprising a speed governor adapted to respond to the driven speed of said engine when connected thereto, a first hydraulic system controlled by said governor, a servo motor means operated by said first hydraulic system, a servo valve controlled by said servo motor means, a second hydraulic system controlled by said servo valve, a control piston operated by said second hydraulic system adapted to regulate the flow of fuel to the engine when connected thereto, fluid pressure responsive means adapted to respond to engine fuel pressure when connected thereto for operating said servo valve in opposing relation to said servo motor means, said servo motor means including a first piston to operate said servo valve in one sense, and said engine fuel pressure responsive means includes a second piston in longitudinal alignment with said first piston to operate said servo valve in a second sense.

14. Regulating means for regulating the fuel supply for an engine; said regulating means comprising a speed governor adapted to respond to the driven speed of said engine when connected thereto, a first hydraulic system controlled by said governor, a servo motor means operated by said first hydraulic system, a servo valve controlled by said servo motor means, a second hydraulic system controlled by said servo valve, a control piston operated by said second hydraulic system adapted to regulate the flow of fuel to the engine when connected thereto, fluid pressure responsive means adapted to respond to engine fuel pressure when connected thereto for operating said servo valve in opposing relation to said servo motor means, said servo motor means including a piston operated by the first hydraulic system, a spring opposing movement of said piston by said first hydraulic system, spring reset means relatively slowly responsive to change in the hydraulic operating pressure of said first system from a predetermined value for resetting said spring to a preset value and thereby effect a change in the position of said piston, and stop means for limiting movement of said piston in a sense to determine the maximum and minimum permissible fuel pressure.

15. Regulating means for regulating the fuel supply for an engine; said regulating means comprising a speed governor adapted to respond to the driven speed of said engine when connected thereto, a first hydraulic system controlled by said governor, a servo motor means operated by said first hydraulic system, control means operated by said servo motor means adapted to control the flow of fuel to said engine when connected thereto, fluid pressure responsive means adapted to respond to engine fuel pressure when connected thereto for affecting said control means so as to provide a compensating adjustment to said fuel control means to prevent hunting, a second hydraulic system controlled by said fluid pressure responsive means, a second servo motor means operated by said second hydraulic system and operatively connected to said control means to relatively slowly wipe out the compensating adjustment.

16. Regulating means for regulating the fuel supply for an engine; said regulating means comprising a speed governor adapted to respond to the driven speed of said engine when connected thereto, a first hydraulic system controlled by said governor, a servo motor means operated by said first hydraulic system, control means operated by said servo motor means adapted to control the flow of fuel to said engine when connected thereto, fluid pressure responsive means adapted to respond to engine fuel pressure when connected thereto for affecting said control means so as to provide a compensating adjustment to said fuel control means to prevent hunting, a second servo motor means, means responsive to the operating pressure of said first hydraulic system to hydraulically control said second servo motor means, resilient means operatively connecting said first and second servo motor means, and liquid flow restricting means between said operating pressure responsive control means and said second servo motor means to effect a relatively slow adjustment of said second servo motor to wipe out the compensating adjustment of said fuel control means.

17. For use in regulating fuel for an engine to drive an electric generator connected to supply power to a variable load; the combination comprising a speed governor responsive to the driven speed of said generator, means for controlling the fuel supply to said engine, a U-shaped lever having opposite arms, means pivotally mounting said U-shaped lever at a point intermediate the opposite arms thereof, said U-shaped lever operatively connected at one arm to said control means, means operatively connecting said governor to the other arm of said U-shaped lever, an electromagnet responsive to the output load current of said generator and associated with said lever so as to apply a magnetic force to said one arm to directly bias said lever in a sense to vary the speed setting of said governor inversely with the electrical load applied to the generator.

18. The combination defined by claim 17 including means for effecting a follow-up action upon a change of said control means, said follow-up means including a spring acting upon said one arm of the U-shaped lever and arranged to partially oppose the stated change of said control means by said U-shaped lever.

19. For use in regulating an engine for driving a variable load; the combination comprising means for controlling a variable operating speed condition of said engine which condition is changeable with the load applied to said engine, means for operating said controlling means in response to changes in said variable condition, follow-up means for effecting a follow-up action upon a change of said controlling means, said follow-up means being arranged to partially retard the stated operation of said controlling means by said operating means, and load responsive means to vary the magnitude of said follow-up action inversely with the load applied to the engine.

20. The combination defined by claim 19 in which said load responsive means includes means for effecting a resetting action upon a change of said controlling means and to relatively slowly return said follow-up means to a null position, a variably positioned means controlled by said resetting means to decrease the magnitude of the follow-up action of said follow-up means with increase in the load on said engine.

21. The combination defined by claim 19 in which said follow-up means includes an arm and a lever operatively interconnected to effect said follow-up action, and said load responsive means includes a motor means for effecting a resetting action upon a change of said controlling means and to relatively slowly return said follow-up means to a null position, and means operated by said motor means to variably position said arm in relation to said lever so as to vary the effect of said follow-up means with the load applied to said engine.

22. For use in an engine control; the combination comprising an electromagnet, a bellows mounted within said electromagnet for sensing an operating condition of the engine, a latch mechanism, means operated by said bellows to release said latch mechanism from a locking position, control means for said engine operatively connected to said latch mechanism, and an armature positioned within said electromagnet to return said latch mechanism to said locking position upon energization of the electromagnet.

23. For use in regulating fuel for an engine to drive an electric generator connected to supply power to a variable load; the combination comprising a speed governor responsive to the driven speed of said generator for regulating the fuel to said engine, control means for adjusting the calibration of said speed governor, means responsive to current variations in said load for supplying a corrective signal to said governor-adjusting control means, the speed of said engine being controlled simultaneously by said governor and by said control means, and engine fuel pressure responsive means for supplying a signal to said speed governor in opposition to said corrective signal.

References Cited in the file of this patent

UNITED STATES PATENTS

| | | |
|---|---|---|
| Re. 17,161 | Innes | Dec. 11, 1928 |
| 1,110,799 | Kramer | Sept. 15, 1914 |
| 1,950,594 | Bryant | Mar. 13, 1934 |
| 2,178,355 | Brunner | Oct. 31, 1939 |
| 2,263,705 | Seippel | Nov. 25, 1941 |
| 2,281,987 | Oswald | May 5, 1942 |
| 2,336,232 | Doran | Dec. 7, 1943 |
| 2,405,888 | Holley | Aug. 13, 1946 |
| 2,407,013 | Ifield | Sept. 2, 1946 |
| 2,489,586 | Ray | Nov. 29, 1949 |
| 2,551,429 | Eppens | May 1, 1951 |
| 2,558,592 | Starkey et al. | June 26, 1951 |
| 2,611,382 | Kuemmerlein et al. | Sept. 23, 1952 |